(12) United States Patent
Okanoue

(10) Patent No.: US 11,108,350 B2
(45) Date of Patent: Aug. 31, 2021

(54) ELECTRIC POWER STEERING APPARATUS

(71) Applicant: Mitsubishi Electric Corporation, Tokyo (JP)

(72) Inventor: Takahiro Okanoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 28 days.

(21) Appl. No.: 16/314,487

(22) PCT Filed: Jul. 6, 2016

(86) PCT No.: PCT/JP2016/070024
§ 371 (c)(1),
(2) Date: Dec. 31, 2018

(87) PCT Pub. No.: WO2018/008110
PCT Pub. Date: Jan. 11, 2018

(65) Prior Publication Data
US 2019/0319572 A1 Oct. 17, 2019

(51) Int. Cl.
*H02P 27/08* (2006.01)
*H01F 27/24* (2006.01)
(Continued)

(52) U.S. Cl.
CPC ............. *H02P 27/08* (2013.01); *H01F 27/24* (2013.01); *H01F 27/28* (2013.01); *H02M 7/5395* (2013.01); *B62D 5/046* (2013.01)

(58) Field of Classification Search
CPC ....... D06F 37/203; D06F 33/00; H02K 11/33; H02M 7/5387; H02P 27/06
See application file for complete search history.

(56) References Cited

U.S. PATENT DOCUMENTS

2014/0300304 A1 10/2014 Omae et al.
2015/0077025 A1 3/2015 Suzuki
(Continued)

FOREIGN PATENT DOCUMENTS

JP 7-220950 A 8/1995
JP 9-134827 A 5/1997
(Continued)

OTHER PUBLICATIONS

Translation of JPH09306757 has been attached.*
(Continued)

*Primary Examiner* — Zoheb S Imtiaz
(74) *Attorney, Agent, or Firm* — Sughrue Mion, PLLC

(57) ABSTRACT

Provided is an electric power steering device including: a DC power supply; a motor; an inverter circuit configured to convert a DC power output from the DC power supply to an AC power and output the AC power after the conversion to the motor; and a filter circuit, which is provided between the DC power supply and the inverter circuit, and includes a choke coil. The choke coil includes: a core; and one or more conductor sets each including two conductors wound in parallel on the core. A tip on one side of each of the two conductors included in each of the conductor sets is connected to the DC power supply side, and a tip on another side of each of the two conductors is connected to the inverter circuit side.

9 Claims, 5 Drawing Sheets

(51) Int. Cl.
    *H01F 27/28*     (2006.01)
    *H02M 7/5395*     (2006.01)
    *B62D 5/04*     (2006.01)

(56) References Cited

U.S. PATENT DOCUMENTS

2017/0012506 A1\*   1/2017   Naito ................... H02K 11/33
2017/0309395 A1\*  10/2017   Shiraki ................. B60L 50/13

FOREIGN PATENT DOCUMENTS

| | | |
|---|---|---|
| JP | 9-306757 A | 11/1997 |
| JP | H09306757  \* | 11/1997 |
| JP | 11-251159 A | 9/1999 |
| JP | 2002-252119 A | 9/2002 |
| JP | 2015-061379 A | 3/2015 |
| JP | 5777898 B2 | 9/2015 |
| WO | 2013/132584 A1 | 9/2013 |
| WO | 2016/088460 A1 | 6/2016 |

OTHER PUBLICATIONS

International Search Report for PCT/JP2016/070024 dated Oct. 4, 2016 (PCT/ISA/210).
Communication dated Jul. 12, 2019, from the European Patent Office in counterpart European Application No. 16908154.4.

\* cited by examiner

ELECTRIC POWER STEERING APPARATUS

CROSS REFERENCE TO RELATED APPLICATIONS

This application is a National Stage of International Application No. PCT/JP2016/070024 filed Jul. 6, 2016.

TECHNICAL FIELD

The present invention relates to an electric power steering (EPS) device including a choke coil to be used as a measure against noise.

BACKGROUND ART

A related-art choke coil to be used as a noise filter has, for example, such a structure that conductive wires are wound on a core made of ferrite, and serves as a low-pass filter configured to remove high-frequency noise. The choke coil is inserted in series to power supply lines, and is intended to achieve the function as the filter.

In order to secure an inductance required to provide the filter function in the choke coil, the number of turns of the coil, a shape of a magnetic circuit, the size of the core, and the like are examined. Further, a current flows through the choke coil in accordance with a load, and thus the thickness of the coil is examined based on a rating of the supplied current to determine specifications of the coil, and the coil is mounted on a product. Moreover, both ends of the coil are connected to conductor plates, for example, bus bars, wiring substrates, and the like through welding or soldering.

CITATION LIST

Patent Literature

[PTL 1] JP 5777898 B2

SUMMARY OF INVENTION

Technical Problem

In view of enhancement of fail-safe design in recent years, the need for redundancy of connection of a choke coil portion has been increasing.

As a failure mode, when a disconnection occurs in a filter circuit including a choke coil, the disconnection causes shutoff of the power supply line, and thus a behavior at the time of a sudden stop of assist is required to be considered in the electric power steering device. In order to avoid this behavior, it is required to achieve a redundant design capable of preventing the power supply line from being shut off, to thereby avoid the failure mode.

The following measure is simply conceivable in order to redundantly configure a current conduction path of the filter circuit, such as the windings and connection portions of the choke coil. Specifically, twice as many coils as those for a required portion of the choke coil are prepared, and the coils are connected in parallel, to thereby supplement a disconnection of one coil in the winding of a coil main body and a wiring connection portion through use of another coil.

In this case, the above-mentioned measure is examined while assuming a case of application to a specific design. For example, referring to a device disclosed in Patent Literature 1, related-art choke coils are normal mode coils, and one of the choke coils is inserted on each of upstream and downstream sides of the circuit. When two of the choke coils connected in parallel are arranged on each side, although the purpose of the redundant configuration is achieved, an occupied area approximately twice as wide as that for one coil is required, and it is difficult to include the coils in the related-art device.

Moreover, in terms of an operation of the electric circuit, a combined inductance obtained when the two coils having equivalent characteristics are connected in parallel decreases to a half of the inductance of the original single coil. Thus, there is a problem in that, unless twice as many coils each having a high inductance, namely, coils large in size, as the original coils are prepared, degradation in filter characteristic from the original filter characteristic is induced.

The present invention has been made in view of the above-mentioned problem, and has an object to provide an electric power steering device capable of achieving a redundant design that can effectively prevent shutoff of a power supply line.

Solution to Problem

According to one embodiment of the present invention, there is provided an electric power steering device including: a DC power supply; a motor; an inverter circuit configured to convert a DC power output from the DC power supply to an AC power and output the AC power after the conversion to the motor; and a filter circuit, which is provided between the DC power supply and the inverter circuit, and includes a choke coil, wherein the choke coil includes: a core; and one or more conductor sets each including two conductors wound in parallel on the core, and wherein a tip on one side of each of the two conductors included in each of the one or more conductor sets is connected to the DC power supply side, and a tip on another side of the each of the two conductors is connected to the inverter circuit side.

Advantageous Effects of Invention

According to the one embodiment of the present invention, it is possible to provide the electric power steering device capable of achieving the redundant design that can effectively prevent the shutoff of the power supply line.

DESCRIPTION OF EMBODIMENTS

Now, an electric power steering device according to each of exemplary embodiments of present invention is described with reference to the accompanying drawings. In the illustration of the drawings, the same components are denoted by the same reference symbols, and the overlapping description thereof is herein omitted. Moreover, a case in which the present invention is applied to an electric power steering device for a vehicle is exemplified in each of the embodiments. In general, the electric power steering device for a vehicle is intended to reduce a steering force of a driver by imparting an assist torque by a motor to a steering device via a speed reduction gear.

First Embodiment

Figure 1:
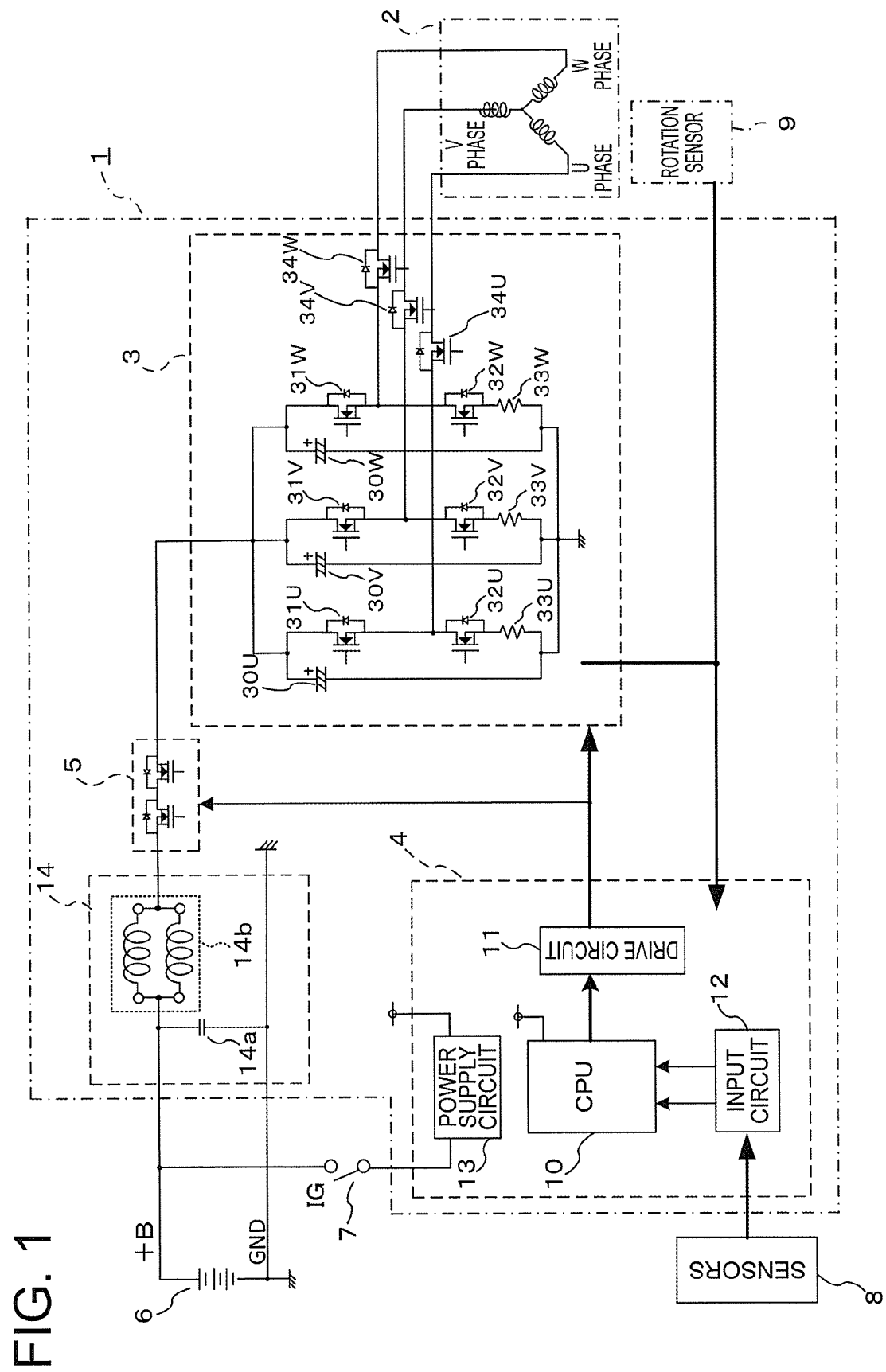
FIG. 1 is an overall circuit diagram for illustrating a circuit configuration of an electric power steering device according to a first embodiment of the present invention.

FIG. 1 is an overall circuit diagram for illustrating a circuit configuration of an electric power steering device according a first embodiment of the present invention. The electric power steering device of FIG. 1 includes a control unit 1, a motor 2, a battery 6, an ignition switch 7, sensors 8, and a rotation sensor 9.

The control unit 1 includes an inverter circuit 3, a control circuit 4, a filter circuit 14, and a power-supply-relay switching element 5. The inverter circuit 3 is configured to convert a DC power output from the battery 6 to an AC power and output the AC power after the conversion to the motor 2. The control circuit 4 includes a CPU 10, a drive circuit 11, an input circuit 12, and a power supply circuit 13. The filter circuit 14 includes a capacitor 14a and a choke coil 14b.

The battery 6, the ignition switch 7, the sensors 8, and the rotation sensor 9 are each connected to the control unit 1. The sensors 8 include, for example, a torque sensor and a speed sensor. The torque sensor is mounted close to a steering wheel of the vehicle, and is configured to detect a steering torque. The speed sensor is configured to detect a travel speed of the vehicle.

The battery 6 is an example of a DC power supply, and is mounted to the vehicle. A +B line serving as a battery power supply line and a GND line serving as a ground line are connected from the battery 6. A power supply is turned on through the power supply circuit 13 of the control circuit 4 by the ignition switch 7. The sensors 8 output information such as the steering torque detected by the torque sensor, the travel speed of the vehicle detected by the speed sensor, and the like to the control circuit 4.

The power supply that has passed through the filter circuit 14 serves as a current source of the inverter circuit 3. Moreover, emission of noise generated by the device is suppressed by the filter circuit 14.

The information output from the sensors 8 is transmitted to the CPU 10 via the input circuit 12 of the control circuit 4. The CPU 10 is configured to calculate current values, which are control amounts for rotating the motor 2, from the information acquired from the sensors 8, and output the current values. The current values output by the CPU 10 are transmitted to an output circuit formed of the drive circuit 11 and the inverter circuit 3.

The drive circuit 11 included in the output circuit is configured to receive a command signal from the CPU 10 and output PWM control signals as drive signals for driving respective switching elements 31U, 31V, 31W, 32U, 32V, and 32W of the inverter circuit 3 in accordance with the command signal. Only a small current flows through the drive circuit 11, and the drive circuit 11 is thus arranged in the control circuit 4, but the drive circuit 11 may be arranged in the inverter circuit 3.

The inverter circuit 3 includes the upper-arm switching elements 31U, 31V, and 31W and the lower-arm switching elements 32U, 32V, and 32W respectively corresponding to a U-phase winding, a V-phase winding, and a W-phase winding of the motor 2, motor-relay switching elements 34U, 34V, and 34W, shunt resistors 33U, 33V, and 33W for current detection, and noise-suppression capacitors 30U, 30V, and 30W. The motor-relay switching elements 34U, 34V, and 34W are configured to connect and cut off lines to the motor windings. The inverter circuit 3 has the same circuit configurations for the windings in the respective phases, and is capable of independently supplying currents to the windings in the respective phases.

In addition to an electric potential difference between both ends of each of the shunt resistors 33U, 33V, and 33W, for example, a voltage at the end of each of the motor windings and the like is transmitted to the input circuit 12. This information is also input to the CPU 10. The CPU 10 calculates a difference between each of the calculated current values and the detection value corresponding to the current value, to thereby carry out so-called feedback control. As a result, desired motor currents are supplied, to thereby assist the steering force.

A drive signal for the power-supply-relay switching element 5 operating as a relay configured to connect/cut off between the +B line and the power supply of the inverter circuit 3 is also output from the drive circuit 11. A current supply to the motor 2 itself can be cut off by the power-supply-relay switching element 5. The motor-relay switching elements 34U, 34V, and 34W are also provided in the inverter circuit 3, and are capable of cutting off the current supply to the respective phases of the motor 2.

The CPU 10 has an abnormality detection function of detecting abnormality in the drive circuit 11, the inverter circuit 3, the motor windings, and the like as well as the sensors 8 from the respective pieces of input information. When the CPU 10 detects abnormality of the motor 2, for example, in order to cut off the current supply to a specific phase, the CPU 10 turns off the upper- and lower-arm switching elements and the motor-relay switching elements corresponding to the phase in accordance with the abnormality. Moreover, the CPU 10 can turn off the power-supply-relay switching element 5 so as to cut off the power supply itself from the source.

The motor 2 is exemplified as a DC brushless synchronous motor in which the windings in the three phases form a delta connection. The rotation sensor 9 configured to detect a rotor rotation position is mounted to appropriately determine the currents in the three phases supplied to the DC brushless synchronous motor in accordance with the rotation position of the rotor. Information on the rotor rotation position detected by the rotation sensor 9 is transmitted to the input circuit 12 of the control circuit 4.

Moreover, the connection type of the motor 2 may not be the delta connection, but may be a star connection. Moreover, the motor 2 provided for the electric power steering device is not limited to the DC brushless synchronous motor, and various motors may be used. For example, an induction motor may be used as the motor 2 to omit the rotation sensor 9, or the motor 2 may be a motor provided with a plurality of pairs of brushes.

Next, a description is further given of the filter circuit 14. The filter circuit 14 is inserted so as to prevent noise of the control unit 1, in particular, noise caused by the PWM control of the inverter circuit 3, from being radiated from this device to the outside. The choke coil 14b is provided against noise on the +B line, and is of a type called normal mode coil. The capacitor 14a is of a type called across-the-line capacitor or X capacitor.

The filter circuit 14 formed of the capacitor 14a and the choke coil 14b serves to suppress the radiation noise, and is of a type called electromagnetic interference (EMI) filter.

Figure 2:
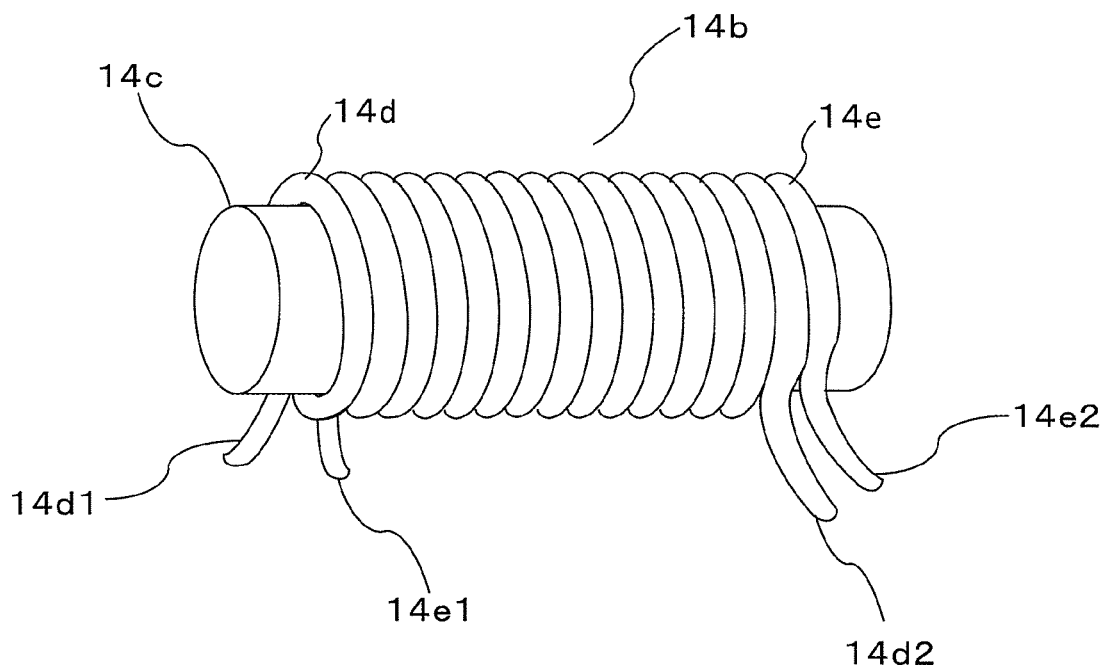
FIG. 2 is a perspective view for illustrating a structure of a choke coil in the first embodiment of the present invention.

Referring to FIG. 2, a description is now given of details of a structure of the choke coil 14b. FIG. 2 is a perspective view for illustrating a structure of the choke coil 14b in the first embodiment of the present invention. The choke coil 14b of FIG. 2 includes a core 14c having a cylindrical shape, and one conductor set including a conductor 14d and a conductor 14e wound in parallel on the core 14c. In other words, the choke coil 14b includes two coils, which are a coil formed by winding the conductor 14d on the core 14c and a coil formed by winding the conductor 14e on the core 14c.

As the core 14c, for example, a ferrite core may be used. Moreover, as the conductor 14d and the conductor 14e, for example, magnet wires may be used.

The conductor 14d and the conductor 14e are simultaneously wound in parallel on the core 14c. A cross section of each of the conductors 14d and 14e is circular. Across-sectional area of each of the conductors 14d and 14e is approximately the same as a cross-sectional area of one conductor at the time when the conductor is wound and used on the core 14c.

A coil formed by winding the conductors 14d and the conductor 14e in parallel on the core 14c is referred to as "double-winding coil", and a coil formed by winding one conductor on the core 14c is referred to as "single-winding coil".

Tips 14d1 and 14e1 on one side of the respective conductors 14d and 14e are each connected to the battery 6 side. Tips 14d2 and 14e2 on another side of the respective conductors 14d and 14e are each connected to the inverter circuit 3 side.

More specifically, the tips 14d1 and 14e1 on the one side of the conductors 14d and 14e are separated from each other, and are extended. Similarly, the tips 14d2 and 14e2 on the another side of the conductors 14d and 14e are also separated from each other, and are extended. A conductive wire used in the filter circuit 14 is independently connected to each of the four in two pairs of tip portions.

Consideration is given to a case in which any one location of the connections between the four in two pairs of tip portions and the conductive wires is disconnected due to a connection defect or the like. Even in this case, the connection between one of the two conductors 14d and 14e and the conductive wire of the filter circuit 14 remains. Thus, continuity of the control can be secured without obstructing the flow of the current flowing through the filter circuit 14, and further, fail-safe can be increased.

When any one location out of the connection locations is disconnected due to connection defect or the like, the coil formed of the one conductor having the remaining connection to the conductive wire of the filter circuit 14 is referred to as "remaining coil".

Moreover, even after any one location out of the above-mentioned connection locations is disconnected due to a connection defect or the like in the double-winding coil, a magnetomotive force formed by the remaining coil to act on the core 14c has the same value as that of the single-winding coil. In other words, it is expected that an effective inductance of the double-winding coil and the inductance of the remaining coil are the same values. Thus, even when one of the two conductors 14d and 14e is disconnected in the double-winding coil, a noise removal effect of the filter circuit 14 does not decrease.

In such a manner, the configuration of the choke coil 14b in the first embodiment does not present a decrease in the noise removal effect after the disconnection of one of the connections of the coil having the double-winding configuration, but is very effective in terms of an implementation property and the maintenance of the noise removal filter property after the disconnection failure compared with a related-art configuration of the choke coil simply using two single-winding coils.

A described above, according to the first embodiment, the choke coil included in the filter circuit of the electric power steering device includes the core and the one conductor set including two conductors wound in parallel on the core. The tip on the one side of each of the two conductors included in the conductor set is connected to the DC power supply side, and the tip on the another side of each of the two conductors is connected to the inverter circuit side.

With the above-mentioned configuration, the electric power steering device capable of achieving a redundant design capable of effectively preventing the interruption of the power supply line can be provided. In other words, even when the choke coil is formed of the two coils, an increase in occupied area of the coil can be suppressed.

Specifically, reduction in size of the choke coil can be achieved by configuring the four in two pairs of tip portions such that each tip portion independently extends, to thereby unify functions corresponding to the two coils. Moreover, even when a disconnection occurs in one coil out of the two coils forming the choke coil, the current supply can be maintained by the another coil.

When each of the two coils forming the choke coil is in the normal connection state, each of the coils is responsible for a half of the current supplied to the choke coil. When disconnection occurs in one of the coils, the entire current flows through another coil. Thus, even when a disconnection occurs in one of the coils, magnetic flux acting on the common magnetic circuit is maintained as in the normal connection state without influence on the inductance of the choke coil, and the operation of the filter circuit can thus be continued.

Second Embodiment

Figure 3:
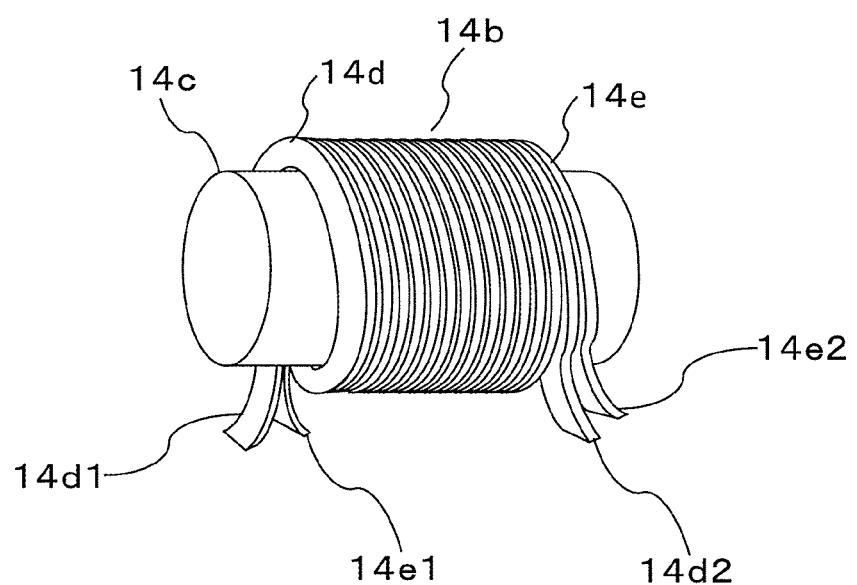
FIG. 3 is a perspective view for illustrating a structure of a choke coil in a second embodiment of the present invention.

A second embodiment of the present invention is different from the first embodiment in that a choke coil 14b is formed by winding on the core 14c conductors 14d and 14e each formed into a flat shape or a plate shape and having a rectangular cross section. The difference is described with reference to FIG. 3. FIG. 3 is a perspective view for illustrating a structure of the choke coil 14b in the second embodiment of the present invention. In the second embodiment, a description is omitted for the same points as those of the first embodiment, and is mainly given of points different from the first embodiment.

In this case, the double-winding coil illustrated in FIG. 2 requires the core 14c approximately twice as long as that of the single-winding coil. Thus, as illustrated in FIG. 3, the conductors 14d and 14e each formed into a flat shape or a plate shape and having a rectangular cross section are used, and the choke coil 14b is formed by winding the conductor 14d and the conductor 14e in parallel on the core 14c.

Further, similarly to the first embodiment, the tips 14d1 and 14e1 on the one side of the conductors 14d and 14e are separated from each other, and are extended. Similarly, the tips 14d2 and 14e2 on the another side of the conductors 14d and 14e are also separated from each other, and are extended.

In the double-winding coil illustrated in FIG. 3, the length of the core 14c can be made equivalent to that of the single-winding coil by reducing the thickness of the conductors 14d and 14e while the conductor cross-sectional areas are maintained to be equivalent to those of the conductors 14d and 14e each having the circular cross section illustrated in FIG. 2. As a result, an increase in external form of the choke coil 14b can be suppressed to be the required minimum so as not to be an obstruction to the implementation.

Consideration is given to a case in which any one of the connection locations between the four in two pairs of tip portions and the conductive wires is disconnected due to a connection defect or the like. In such a case, a current twice as large as the original current flows through the remaining coil, and further, due to the above-mentioned configuration, the conductor in the current supply state and the conductor in the non-current supply state are alternately arranged in the thickness direction of the core 14c. Thus, even when the current twice as large as the original current flows through the remaining coil, heat generated in the coil on the current supply side conducts to the coil on the non-current supply side, and the heat radiation of the heat can thus be facilitated.

In such a manner, the configuration of the choke coil 14b in the second embodiment has such an advantage that a margin can easily be secured for the temperature increase generated by the current concentration on the coil on the current supply side caused by the disconnection of the coil on the one side compared with the related-art configuration of the choke coil simply using two single-winding coils.

As described above, according to the second embodiment, the space factor can be improved to reduce the size of the choke coil through use of the conductors each formed into the flat shape to construct the choke coil compared with the configuration in the first embodiment. Moreover, an increase in mountability of the electric power steering device to the vehicle can be achieved by reducing the size of the choke coil to suppress the increase in space required to mount the coil in a controller of the electric power steering device without increasing the external form of the product.

Third Embodiment

Figure 4:
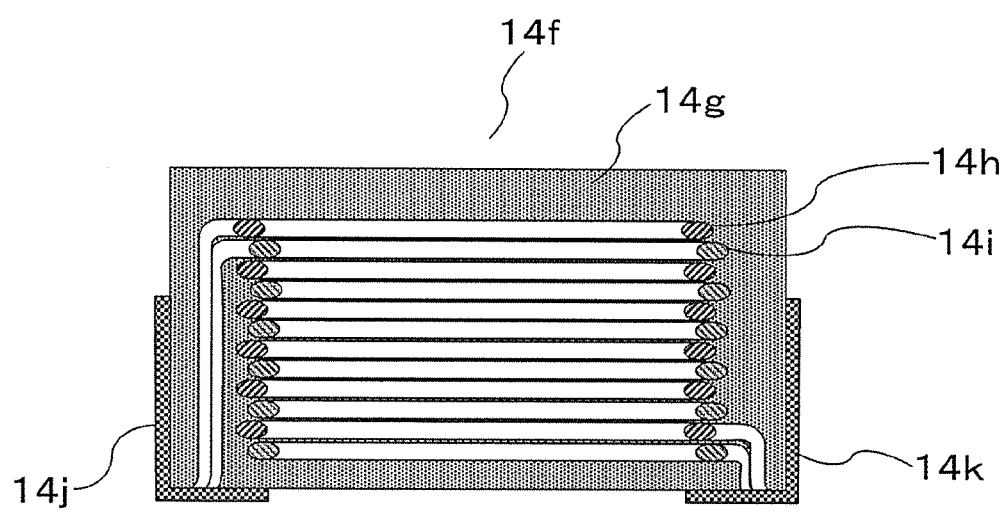
FIG. 4 is a cross-sectional view for illustrating a structure of a choke coil in a third embodiment of the present invention.

In a third embodiment of the present invention, referring to FIG. 4, a description is given of a choke coil 14f having a shape different from that of the choke coil 14b in the first and second embodiments. FIG. 4 is a cross-sectional view for illustrating a structure of the choke coil 14f in the third embodiment of the present invention. In the third embodiment, a description is omitted for the same points as those of the first and second embodiments, and is mainly given of points different from the first and second embodiments.

In this case, while the choke coils 14b in the first and second embodiments have coil structures of an open-magnetic-circuit type, the choke coil 14f in the third embodiment has a coil structure of a closed-magnetic-circuit type.

As illustrated in FIG. 4, two coils formed by winding conductors 14h and 14i, each of which is formed into a flat shape having an ellipsoidal cross section, in parallel are built into a main body 14g of the choke coil 14f. The main body 14g is made of a metal magnetic material. Moreover, each of the conductors 14h and 14i has a flat shape, and thus, even when the two coils are built into the main body 14g, the thickness of the main body 14g can be made thin.

Both ends of the conductor 14h are extended, and the respective ends are connected to terminals 14j and 14k. Similarly, both ends of the conductor 14i are extended, and the respective ends are connected to the terminals 14j and 14k. Each of the terminals 14j and 14k is formed of two terminals. Those terminals are connected to, for example, wiring patterns of a control board.

In such a manner, even when the choke coil 14f is formed into the coil structure of the closed-magnetic-circuit type, the size of the coil can be reduced by simultaneously winding the conductors 14h and 14i each formed into the flat shape in parallel in a thinner direction.

Moreover, by setting a cross-sectional area of each of the conductors 14h and 14i to be approximately the same as the cross-sectional area of one conductor at the time when this one conductor is wound and used, even when a disconnection occurs in any one of the two conductors 14h and 14i, a current equivalent to that before the disconnection can be caused to flow through the conductor that is not disconnected. Thus, the continuity of the control can be achieved through use of the choke coil 14f.

Further, the same noise removal effect as that of the choke coil 14b in the second embodiment can be expected from the choke coil 14f when the disconnection occurs. Moreover, the same applies to securing margins for the current capacity and the temperature increase of the coil for which the current supply continues when the disconnection occurs.

As described above, according to the third embodiment, even when the choke coil is constructed to form the coil structure of the closed-magnetic-circuit type, which is different from the configuration in the first and second embodiments, the same effect as that in the first and second embodiment can be provided.

Fourth Embodiment

Figure 5:
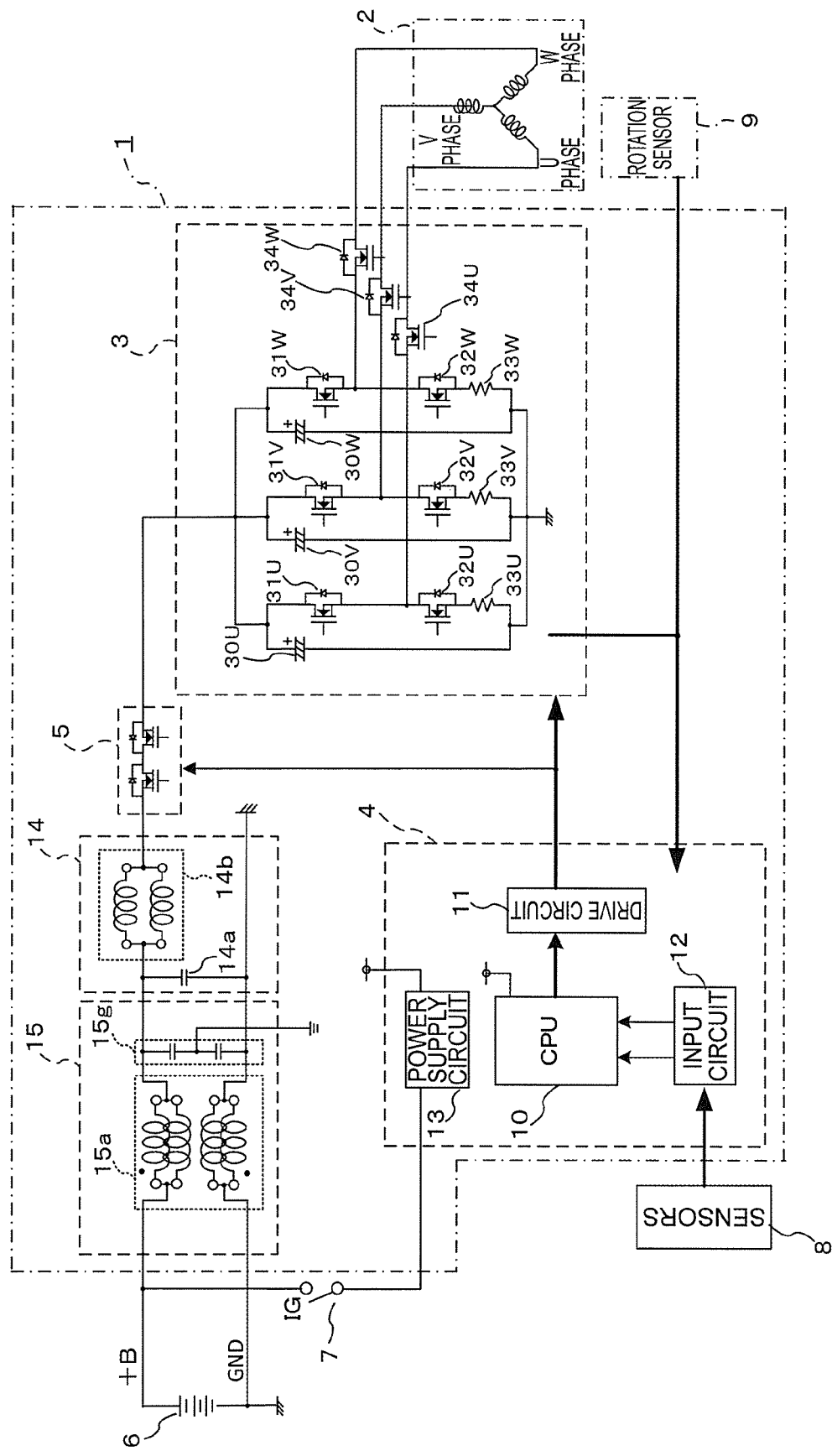
FIG. 5 is an overall circuit diagram for illustrating a circuit configuration of an electric power steering device according to a fourth embodiment of the present invention.
Figure 6:
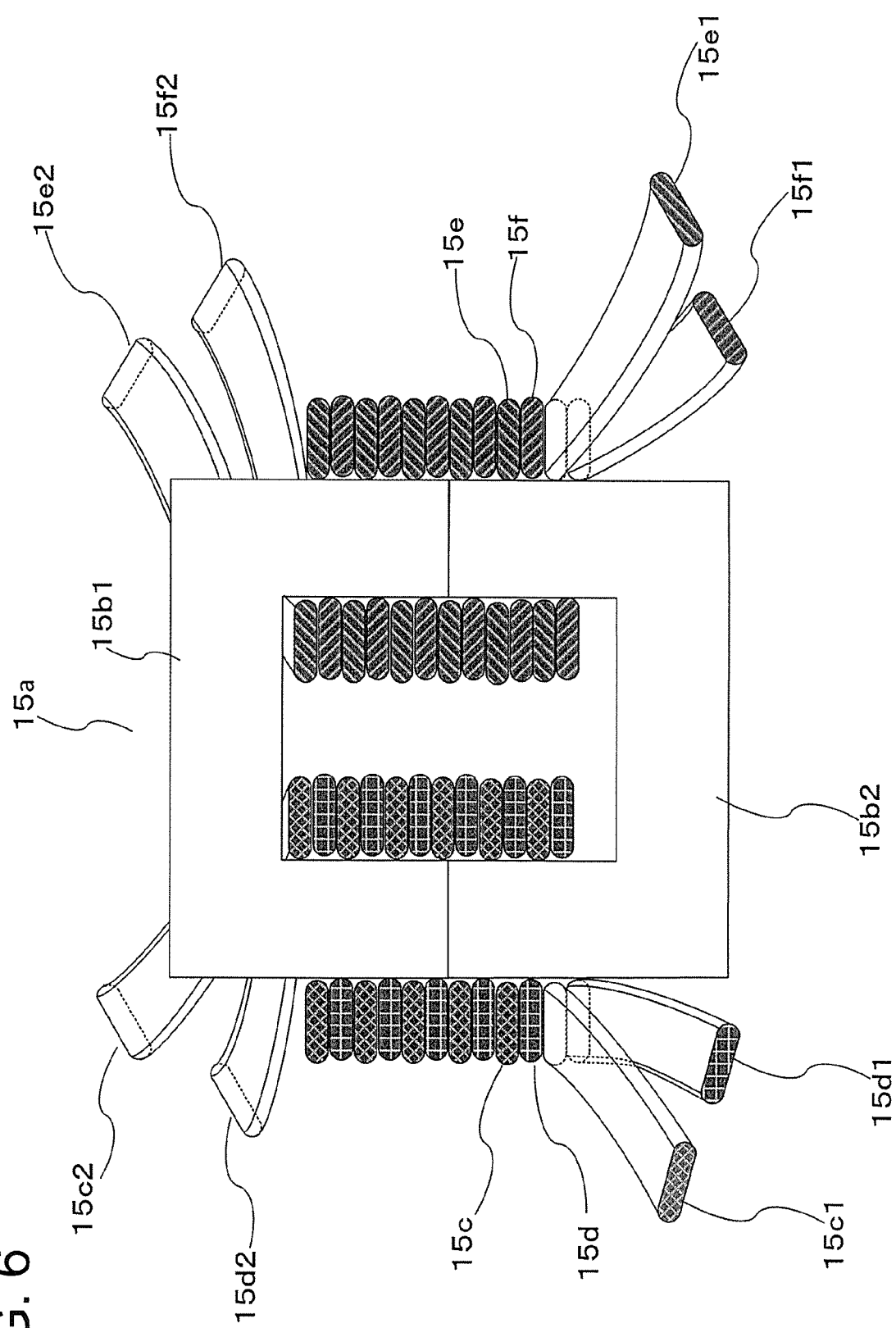
FIG. 6 is a perspective view for illustrating a structure of a choke coil in the fourth embodiment of the present invention.

A fourth embodiment of the present invention is different from the first embodiment in that an electric power steering device includes a filter circuit 15. The difference is described with reference to FIG. 5 and FIG. 6. FIG. 5 is an overall circuit diagram for illustrating a circuit configuration of the electric power steering device according to the fourth embodiment of the present invention. FIG. 6 is a perspective view for illustrating a structure of a choke coil 15a in the fourth embodiment of the present invention. In the fourth embodiment, a description is omitted for the same points as those of the first to third embodiments, and is mainly given of points different from the first to third embodiments.

The electric power steering device of FIG. 5 further includes the filter circuit 15 provided between the battery 6 and the filter circuit 14 in addition to the configuration of FIG. 1. The filter circuit 15 includes a choke coil 15a and two capacitors 15g connected in series. As the configuration of the choke coil 14b included in the filter circuit 14, any one of the configurations in the first embodiment to the third embodiments may be employed.

The choke coil 15a is of a type called common mode coil. The capacitor 15g is of a type called line bypass capacitor or Y capacitor. A connection portion between the two capacitors 15g is connected to a body ground of the vehicle.

In this case, a motor drive circuit of the electric power steering device is required to control a large current, and thus, as a structure design of the motor drive circuit, namely, a PWM inverter circuit, a design that withstands the supply of the large current and heat radiation and considers the mountability is required. Therefore, greatly depending on the structure design of the PWM inverter circuit, a noise current leaking to the +B line and the GND line, which is extracted to the outside of the control unit 1 and provided for the connection to the battery 6 mounted to the vehicle, includes a case in which the normal mode is dominant, a case in which the common mode is dominant, and a case in which a countermeasure is required to be considered for both the normal mode and the common mode.

When a countermeasure is required for the common mode noise, the addition of the choke coil 15$a$ in the common mode to a power-supply-lead-in portion of the control unit 1 is one idea of an effective measure. The common mode coil is formed by winding two sets of coils so as to be opposed to each other around a magnetic circuit forming a closed magnetic circuit, to thereby have a structure providing such a magnetic coupling action of having a large common mode inductance and canceling a normal mode inductance.

Referring to FIG. 6, a description is now given of a structure of the choke coil 15$a$. The choke coil 15$a$ includes a core formed of cores 15$b$1 and 15$b$2 and two conductor sets each including two conductors wound in parallel on the core. Each of the two conductor sets is wound on the core under a state in which the conductor sets are opposed to each other.

Specifically, as illustrated in FIG. 6, the closed magnetic circuit is formed by joining two halves of the ferrite cores 15$b$1 and 15$b$2 each having a U shape to each other. One set of conductors 15$c$ and 15$d$ each formed into a flat shape or a plate shape are wound in parallel on leg portions on one side of the cores 15$b$1 and 15$b$2 joined to each other. Similarly, one set of conductors 15$e$ and 15$f$ each formed into a flat shape or a plate shape are wound in parallel on leg portions on another side.

Tips 15$c$1 and 15$d$1 on one side of the respective conductors 15$c$ and 15$d$ of a first conductor set are each connected to the battery 6 side. Tips 15$c$2 and 15$d$2 on another side of the conductors 15$c$ and 15$d$ are each connected to the inverter circuit 3 side.

More specifically, the tips 15$c$1 and 15$d$1 on the one side of the conductors 15$c$ and 15$d$ of the first conductor set are separated from each other, and are extended. Similarly, the tips 15$c$2 and 15$d$2 on the another side are also separated from each other, and are extended. The four in two pairs of the tip portions are assembled into a connection portion to a conductive wire and a connection portion having a positive polarity, and are thus independently connected to the battery 6 side and the inverter circuit 3 side.

Similarly, tips 15$e$1 and 15$f$1 on one side of the respective conductors 15$e$ and 15$f$ of a second conductor set are each connected to the battery 6 side. Tips 15$e$2 and 15$f$2 on another side of the conductors 15$e$ and 15$f$ are each connected to the inverter circuit 3 side.

More specifically, the tips 15$e$1 and 15$f$1 on the one side of the conductors 15$e$ and 15$f$ of the second conductor set are separated from each other, and are extended. Similarly, the tips 15$e$2 and 15$f$2 on the another side are also separated from each other, and are extended. The four in two pairs of the tip portions are assembled into a connection portion to a conductive wire and a connection portion having a GND polarity, and are thus independently connected to the battery 6 side and the inverter circuit 3 side.

With this configuration, while the function of the common mode coil is achieved, and even after any one of the connection locations between the four in two pairs of tip portions and the conductive wires is disconnected due to a connection defect or the like, the electrical connection to the circuit is maintained by the remaining coil. Therefore, the flow of the current is not obstructed, and the continuity of the control can be secured. Further, the fail-safe can be increased.

Moreover, even when a disconnection occurs in one of the coils, a magnetomotive force formed by the remaining coil to act on the cores 15$b$1 and 15$b$2 can be maintained in the same state as that of the normal connection. Thus, the operation as the common mode coil is not obstructed, and the noise removal function can be maintained.

In such a manner, the configuration of the choke coil 15$a$ in the fourth embodiment does not present a decrease in the noise removal effect after the disconnection of one of the connections of the coil having the double-winding configuration, but is very effective in terms of an implementation property and the maintenance of the noise removal filter property after the disconnection failure compared with the related-art configuration of the choke coil simply using two single-winding coils.

In the fourth embodiment, the case in which the control unit 1 includes both the filter circuit 14 and the filter circuit 15 is exemplified, but the configuration is not limited to this example, and the control unit 1 may include only the filter circuit 15 without the filter circuit 14. Whether both the filter circuit 14 and the filter circuit 15 are employed or only one thereof is employed can appropriately be selected in accordance with specifications of the electric power steering device.

As described above, according to the fourth embodiment, the choke coil included in the filter circuit of the electric power steering device includes the core and the two conductor sets including two conductors wound in parallel on the core. The tip on the one side of each of the two conductors included in the two conductor sets is connected to the DC power supply side, and the tip on the another side of each of the conductors is connected to the inverter circuit side. Moreover, the two conductor sets are wound on the core under the state in which the conductor sets are opposed to each other.

With the above-mentioned configuration, even when the choke coil is the common mode coil, the same effect as that of the first and second embodiments is provided.

Descriptions have been given of the first to fourth embodiments individually, but respective configuration examples described in the first to fourth embodiments can be combined in any way.

The invention claimed is:

1. An electric power steering device, comprising:
   a DC power supply;
   a motor;
   an inverter circuit configured to convert a DC power output from the DC power supply to an AC power and output the AC power after the conversion to the motor; and
   a filter circuit, which is provided between the DC power supply and the inverter circuit, and includes a choke coil,
   wherein the choke coil includes:
      a core; and
      one or more conductor sets each including two conductors wound in parallel on the core, and
   wherein a tip on one side of each of the two conductors included in each of the one or more conductor sets is connected to a same terminal of the DC power supply side, and a tip on another side of the each of the two conductors is connected to a same terminal of the inverter circuit side.

2. The electric power steering device according to claim 1,
   wherein the choke coil includes a normal mode coil, and wherein the choke coil includes one conductor set as the one or more conductor sets.

3. The electric power steering device according to claim 1,
wherein the choke coil includes a common mode coil,
wherein the choke coil includes two conductor sets as the one or more conductor sets, and
wherein the two conductor sets are wound on the core under a state in which the two conductor sets are opposed to each other.

4. The electric power steering device according to claim 1, wherein the two conductors are each formed into a flat shape.

5. The electric power steering device according to claim 2, wherein the two conductors are each formed into a flat shape.

6. The electric power steering device according to claim 3, wherein the two conductors are each formed into a flat shape.

7. The electronic power steering device according to claim 1, wherein the choke coil is connected in series between the DC power supply side and the inverter circuit side.

8. The electronic power steering device according to claim 1, wherein the choke coil is configured to supply the DC power to the inverter circuit side to drive the motor.

9. The electronic power steering device according to claim 1, wherein the core includes a cylindrical core portion and the two conductors are wound on the same cylindrical core portion.

* * * * *